United States Patent
Hoarau et al.

(10) Patent No.: US 8,687,213 B2
(45) Date of Patent: Apr. 1, 2014

(54) DATA FILTERING FOR PRINT SERVICE PROVIDERS

(75) Inventors: Eric Hoarau, San Francisco, CA (US); Jun Zeng, Sunnyvale, CA (US); I-Jong Lin, Half Moon Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 614 days.

(21) Appl. No.: 12/970,884

(22) Filed: Dec. 16, 2010

(65) Prior Publication Data

US 2012/0154846 A1 Jun. 21, 2012

(51) Int. Cl.
*G06K 15/00* (2006.01)
*G06F 3/12* (2006.01)

(52) U.S. Cl.
USPC ....... 358/1.14; 358/1.15; 358/1.13; 358/1.12; 358/1.1

(58) Field of Classification Search
None
See application file for complete search history.

(56) References Cited

U.S. PATENT DOCUMENTS

| | | | |
|---|---|---|---|
| 4,827,109 A * | 5/1989 | Matsumoto et al. | 235/375 |
| 6,441,920 B1 | 8/2002 | Smith | |
| 7,051,328 B2 | 5/2006 | Rai | |
| 7,113,959 B1 * | 9/2006 | Klatt et al. | 705/7.21 |
| 7,515,244 B2 | 4/2009 | Ozawa | |
| 7,751,070 B2 * | 7/2010 | Sato | 358/1.13 |
| 7,855,799 B2 * | 12/2010 | Shah | 358/1.15 |
| 8,223,377 B2 * | 7/2012 | Shah | 358/1.15 |
| 8,520,232 B2 * | 8/2013 | Harmon et al. | 358/1.15 |
| 2002/0156756 A1 | 10/2002 | Stanley et al. | |
| 2004/0210454 A1 | 10/2004 | Coughlin et al. | |
| 2006/0206445 A1 * | 9/2006 | Andreoli et al. | 706/52 |
| 2007/0247659 A1 | 10/2007 | Zhang et al. | |
| 2008/0285067 A1 | 11/2008 | Rai | |
| 2009/0094094 A1 | 4/2009 | Rai et al. | |
| 2009/0129638 A1 * | 5/2009 | Kim | 382/118 |
| 2009/0157579 A1 | 6/2009 | Rai | |
| 2009/0199734 A1 * | 8/2009 | Vered | 101/483 |
| 2009/0249290 A1 | 10/2009 | Jenkins et al. | |
| 2009/0268230 A1 | 10/2009 | Rai | |
| 2010/0057660 A1 | 3/2010 | Kato | |
| 2010/0250200 A1 * | 9/2010 | Mori et al. | 703/1 |
| 2012/0250074 A1 * | 10/2012 | Kamppari et al. | 358/1.15 |
| 2012/0257252 A1 * | 10/2012 | Shah | 358/1.15 |

OTHER PUBLICATIONS

Derek Korn: http://www.mmsonline.com/articles/managing-information-maximizes-efficiency; Publication Date: Aug. 8, 2008; Managing Information Maximizes Efficiency.
Karolyn Duncan, David L. Wells; http://www.dama-pdx.org/Cleasing.PDF; Rule Based Data Cleansing for Data Warehousing.
http://www.msb.com.my/
Axapta%20articles%20and%20whitepapers/Manufacturing/pdf/axa%20shop%20floor%20control.pdf; Shop Floor Control.

(Continued)

Primary Examiner — Satwant Singh

(57) ABSTRACT

Systems and methods of data filtering for a print service provider (PSP) are disclosed. An exemplary method includes receiving a plurality of print service parameters. The method also includes filtering the plurality of print service parameters, wherein a portion of the received plurality of print service parameters are retained in machine readable format. The method also includes saving the filtered print service parameters for enhancing automatic and manual print production processes.

22 Claims, 8 Drawing Sheets

(56) References Cited

OTHER PUBLICATIONS

Demetrios Zeinalipour-Yazti; Panos K. Chrysanthis; http://www.emeraldinsight.com/journals.htm?issn=1355-2511&volume=15&issue=1&articleid=1782694&show=html&PHPSESSID=1bl6i4l81ljsujr315mukp2gu0 ; Publication Date: 2009; vol. 15; Mobile solutions for engineering asset and maintenance management.

Christos Emmanouilidis; Jayantha P. Liyanage; Erkki Jantunen; http://www.emeraldinsight.com/journals.htm?iissn=1355-2511&volume=15&issue=1&articleid=1782694&show=html&PHPSESSID=1bl6i4l81jsujr315mukp2gu0; Publication Date: 2009; vol. 15; Mobile solutions for engineering asset and maintenance management.

* cited by examiner

DATA FILTERING FOR PRINT SERVICE PROVIDERS

BACKGROUND

Despite the "electronic age," there is still demand for print services. Print service providers (PSPs) fulfill the demand for print services by printing everything from photographs and brochures, to course materials, periodicals and books. In a modern PSP facility, the management sets targets for average production based on experience and various resource projections. Resources include, but are not limited to, budget considerations (both time and money), equipment (downtime for repairs, cleaning, etc.), and labor (hiring expertise, allotting for planned days off in addition to unplanned sick days, etc.).

Sensing and tracking products, parts, equipment status, and worker activities during the production cycle is common practice in most other manufacturing industries. Now PSPs are also embracing the digital transformation, and as a result, are starting to collect operational information. The data collected can be used to measure the "health" of the PSP facility, identify and address issues, and inform decision making to improve the efficiency. These PSPs are more nimble, able to adapt to market conditions faster, and ultimately help to ensure sustained growth.

Current practice, however, implements ad-hoc data logging. That is, PSPs usually store any data that can possibly be gathered, indiscriminately, in order to be safe, regardless of whether the data is useful or not. The data is often stored in raw format, in backup drives or log files, making it difficult to utilize productively. This makes the analysis of the data much more difficult due to the large amount of data and diverse quality of the data (which can be incomplete or corrupted).

While it is relatively inexpensive to acquire and store digital data, retrieving and analyzing the information in a timely manner can be time consuming and expensive. In practice, the deluge of information usually means that the data is stored in large databases or backup files, and often forgotten unless there is a major production issue. Only then is an investigative team formed to go back through the massive backlog of data and try to understand the cause of the issue, and take corrective action to prevent the same issue from occurring again in the future.

In more advanced systems, basic statistics may be calculated automatically for the digital components of the PSP. For example, local hardware and queue statistics may be provided to the press operator or floor manager. But these systems only provide a limited understanding of potential issues to the operators, and typically provide little if any information concerning individual jobs.

For the sections of the PSP that contain analog devices, the process characteristics during production are often entirely ignored. Printed sheets may be placed in folders and used by the managers "walking the floor" to keep track of the work in progress. Once the job is complete, these sheets may be saved for some time in case issues arise, but are eventually discarded. These sections of the PSP are referred as "digital dead zones."

Process statistics (e.g., Takt time) are usually only estimated once during the initial floor layout and never reviewed again until the next major revision of the production floor layout. This combination of factors makes it difficult, if not impossible, to gain a good understanding of the PSP operations in real time.

DETAILED DESCRIPTION

Figure 1:
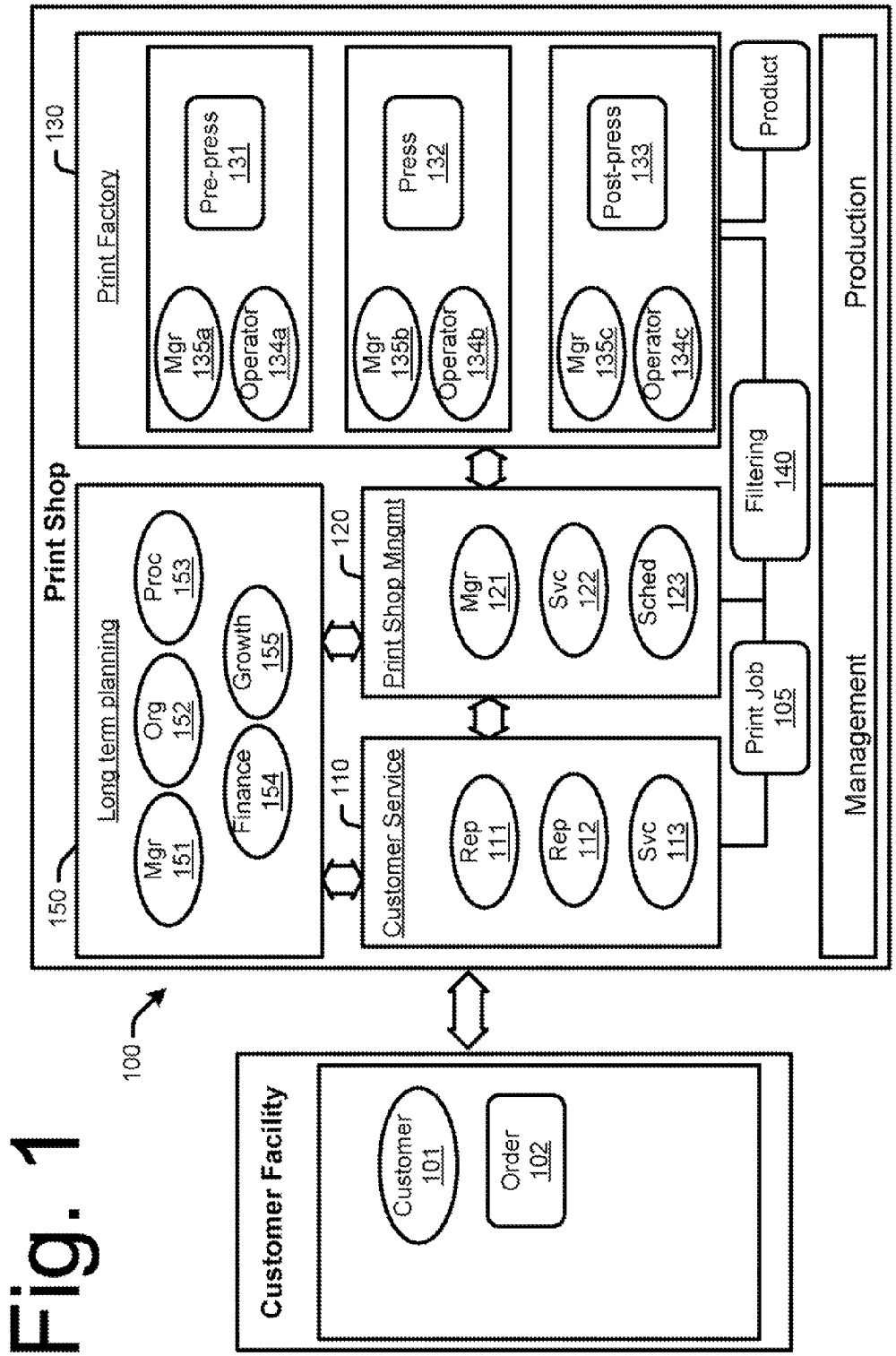
FIG. 1 is a block diagram illustrating an example PSP.

Timely print service parameters may be used by a print service provider (PSP) for business strategy, including decisions to expand or consolidate operations, the purchase of new equipment, hiring/scheduling employees, and various factory operation considerations. By way of illustration, a PSP may use print service parameters to plan production, devise policies, manage production to achieve operations goals or targets (e.g., throughput target, service level target), administer labor force (e.g., hiring, scheduling), and evaluate and give constructive feedback to employees (e.g., administering compensation, bonus calculations), to name only a few examples.

Briefly, historical data, human knowledge, and industry standards can be used to derive a knowledge base. The knowledge base may be used to filter and prioritize the large amounts of information collected, and make this information available for fast retrieval, to perform analysis, make predictions, and provide recommendations on how to improve the efficiency of the PSP. Mobile devices may also be used to collect data and to control jobs in real-time, even in the so-called "digital dead-zones."

An example embodiment includes collecting a plurality of automatic print service parameters in real-time, and at substantially the same time as a plurality of manual print service parameters. A reduced version of the data that has been collected may be used in a dynamic feedback platform, including bandwidth-constrained mobile devices. For example, the data may be used to determine performance metrics of the PSP (e.g., derived via modeling, simulation, extrapolating from historical records, etc.), and compared to actual performance at the PSP to enhance operations.

The present embodiments integrate digital technologies and an information technology (IT) infrastructure using real-time information to provide dynamic feedback to the user (e.g., individual workers and their managers) based on actual operational data, which may be used for setting realistic production targets and enhancing overall performance. Thus, the systems and methods enable workers and managers to quickly and easily understand how they are performing, and to understand which resources and where the resources should be allocated. This approach reduces or altogether eliminates the guesswork and reaction delay which is intrinsic to the previous dynamic print production processes.

Accordingly, the embodiments described herein enable holistic system approaches that dynamically optimize print production processes based on the unique combination of equipment, domain expertise, product offerings, business needs, and the addressable market of each PSP. Interfaces and workflow solutions may also be provided that extend beyond the pre-press and press and into the finishing area. Included in this approach, without limitation, is factory scheduling, production planning, workflow management, simulation aided decision-making, optimization, knowledge discovery, and monitoring and tracking.

FIG. 1 is a block diagram illustrating an exemplary PSP 100. Also shown in FIG. 1 is a customer 101. The customer 101 may be an individual, a group of individuals, or an organization (non-profit, small business, corporation, and the like).

Although not typically well-suited to an individual, the PSP 100 may function to process print jobs for multiple individuals, such as, the customers of a large retailer, wherein the large retailer takes orders from the individuals (e.g., for photo calendars) and submits the order as a batch of individual customer orders to the PSP 100. In this illustration, the customer 101 is the large retailer submitting the order on behalf of many individuals. Of course the systems and methods described herein are not limited to any particular type or size of customer or customers, and may also be utilized with individual customers 101 of the PSP 100.

In general, the customer 101 creates the material to be printed (e.g., the photographs, brochures, course materials, periodicals, books, advertisements and product packaging) or works with a third-party provider to generate the material to be printed. The customer 101 then submits an order 102 including one or more materials for the PSP 100 to print, along with one or more print parameters (e.g., substrate stock, number of copies, due date, and any special instructions such as laminating and quality level).

The PSP 100 receives and converts the customer's order 102 to a print job 105 as part of customer service 110. A "print job" 105 may include some or all of the print parameters from the order 102, but may also include one or more other parameters, such as prioritizing the print job 105. These priorities may be the same, or different from any priorities specified by the customer 101. For example, meeting the due date may be the same priority for the PSP 100 as for the customer 101. However, the PSP 100 may assign another priority for completing the order 102 prior to the due date, which may be different from one customer 101 to the next (e.g., a repeat and high-volume customer 101 may receive a higher priority from the PSP 100 than a first-time or low-volume customer 101). The print job 105 may also include other parameters assigned by the PSP 100, for example, based on current backlog, supplies in stock, and so forth.

Customer service 110 may also include sales representatives 111, customer service representatives 112, and automatic services 113 that are responsible for advertising and promoting the PSP 100, handling customer complaints, pricing/bidding orders 102, maintaining vendor relations, ordering supplies for the PSP 100, and so forth.

In addition to interfacing with the customer 101, customer service 110 also interfaces with print shop management 120. For example, customer service 110 provides the print job 105 to the print shop management 120 and communicates with the print shop management 120 to ensure that customer expectations are met. Customer service 110 may also assign one or more parameters to the print job 105 based on feedback from the print shop management 120.

Print shop management 120 includes one or more print shop managers 121 and automatic services 122 that are responsible for overseeing operations of the print factory 130, including production scheduling 123. The print shop management 120 is assisted in this regard by data collection and filtering system 140 and methods disclosed herein and described in more detail below.

Print shop management 120 also communicates with long term planning 150. Long term planning 150 may include management 151 (e.g., executive-level managers) who are responsible for site organization 152, process definition 153, finances 154, and growth strategy 155, among other things.

The print factory 130 may include a number of production operations, including pre-press production 131, press production 132, and post-press production 133. In JDF-enabled workflow, job information and instructions are carried in a JDF format job ticket for digital systems, and file folders for the non-digital part of the production. During pre-press production 131, the print job is converted to the prerequisite format (e.g., an electronic bitmap file). During press production 132, the print job is printed on the printing machines. And during post-press production 133, the print job is finished by laminating, cutting, collating, binding, sorting/binning, packaging, and shipping. Quality Analysis may also be implemented during one or more of the production operations. Each of the production operations may include automatic processes and/or manual processes, and in either case, operators 134*a-c* and their respective line managers.

Figure 2:
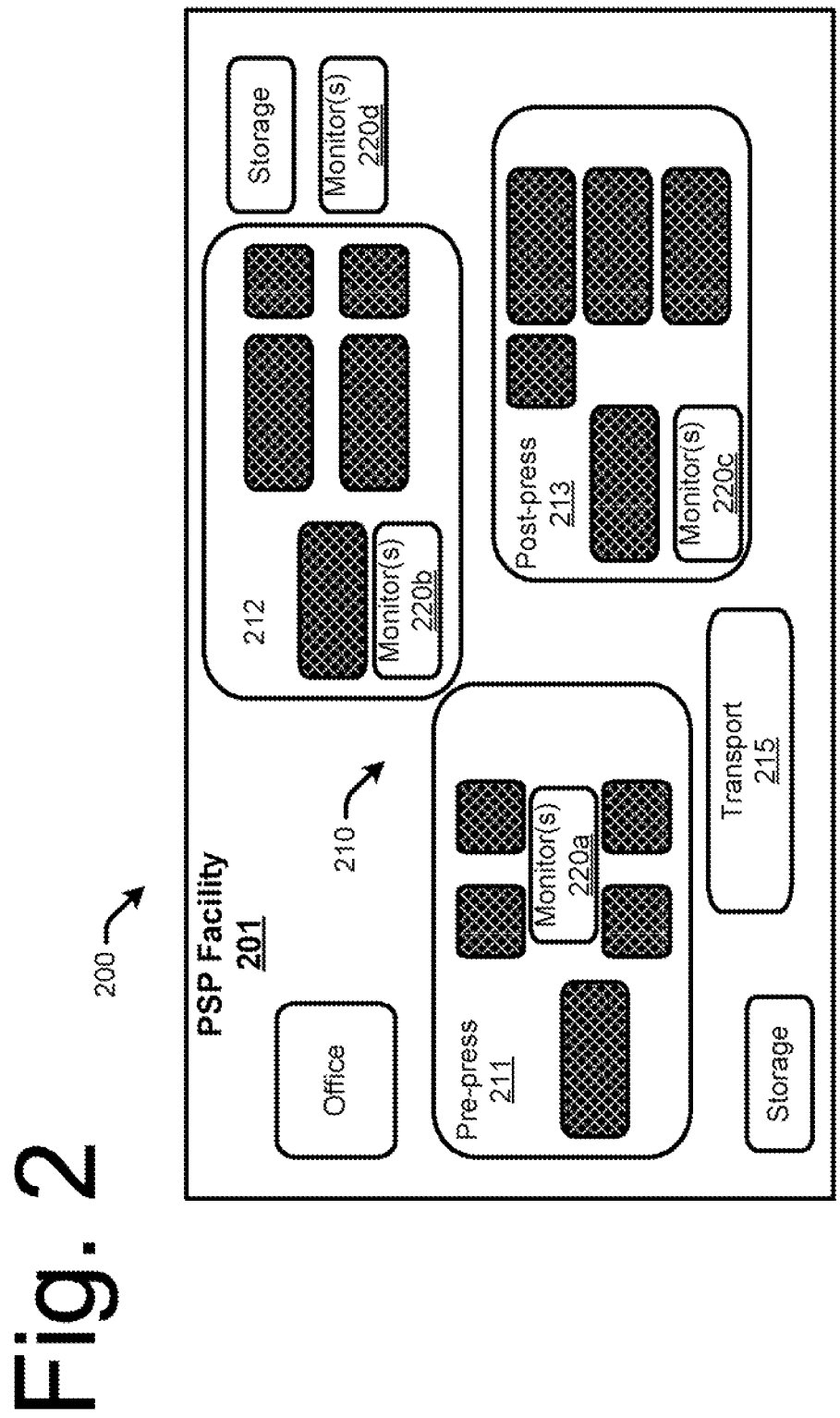
FIG. 2 shows an example layout of a PSP facility.

FIG. 2 shows an exemplary layout 200 of a PSP facility 201. The PSP facility 201 may include office space and storage. The PSP facility 201 also includes a number of stations 210, including one or more pre-press station 211, press station 212, and post-press stations 213, as well as transport 215 between the stations (e.g., conveyors or manual delivery routes).

The stations 210 may include one or more workflow monitors 220*a-d* (including monitors for transport and storage for a more complete view). In one embodiment, these workflow monitors 220 are automatic and include electronic (e.g., infrared (IR), radio frequency identification (RFID), barcode scanning, sounds, or video) sensors, mechanical counters, or the like. In another embodiment, the workflow monitors 220 include input by a user. Of course information may be obtained for any station that is of interest using a combination of automatic and manually obtained information may be used.

In addition to information from production, information may also be obtained from the print shop management, long term planning, and may include real-time and/or historical data. Information may also be obtained from incoming, outgoing print jobs, and customer feedback. Information may be obtained for one or more PSP facility 201.

Figure 3:
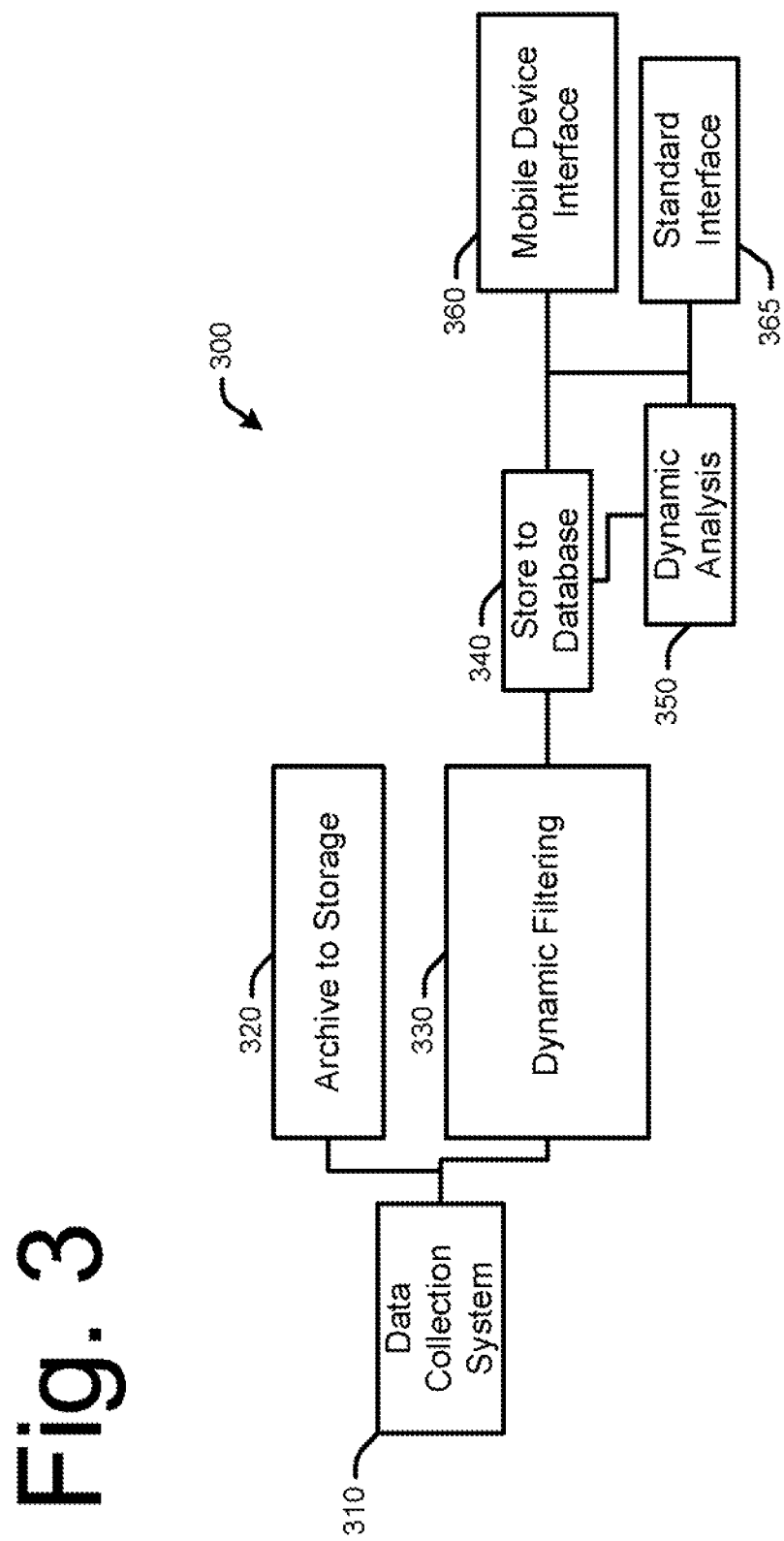
FIG. 3 shows an example system architecture which may be implemented for data filtering for a PSP.

FIG. 3 shows an example system architecture 300 which may be implemented for data filtering for a PSP. The system architecture 300 may include a networked computer system 310. Networked computer system 310 may provide services to computing or data processing systems or devices. Examples include transaction processing services, email services (for delivering alerts), etc.

Networked computer system 310 may also be provided for aggregating data from multiple sensors (and/or other inputs). The networked computer system 310 may be connected to the sensors via one or more communication networks, such as a local area network (LAN) and/or wide area network (WAN), and may be wired and/or wireless (e.g., Wi-Fi). In an exemplary embodiment, networked computer system may also include a web portal on a third-party venue (e.g., a commercial Internet site), which facilitates a connection for one or more clients (e.g., via a back-end link). In another exemplary embodiment, portal icons may be provided (e.g., on third-party venues, pre-installed on computer or appliance desktops, etc.) to facilitate a direct link.

The networked computer system 310 may be communicatively coupled to one or more storage devices 320 for archiving the data being collected. When the data is collected on the production floor, it is saved to the digital storage. The data being collected comes from fulfillment paths in the PSP, which usually have a multi-level hierarchical structure (e.g., from orders to books to parts). In one exemplary PSP, the tracking and tracing of an order alone may include at least three levels of information. Tracking an individual book passing fourteen discrete points of the manufacturing life cycle is accomplished by a diverse set of logging and sensing techniques, including wireless barcode readers. It should be noted that these fourteen points only represent a subset of all the processing steps, and that the resources are shared among the different product paths. For example, soft bound books and hard cover books are products that share some, but not all processing steps.

For two weeks worth of production, the data that traces only the aforementioned partial information may be as much as 4 GB in size. A more complete information data collection system can easily result in ten times or even more data being accumulated. While storage is inexpensive, processing this data dynamically when the user poses a query takes considerable time and may need heavy processing on the back-end. This is an especially important consideration when the interface to the user is via a bandwidth limited platform, such as mobile devices.

Accordingly, the networked computer system 310 may execute a filtering application 330. The filtering application 330 may be implemented in program code which may have any suitable form, including but not limited to, computer software, web-enabled or mobile applications or "apps", so-called "widgets," and/or embedded code such as firmware. Although the program code may comprise a number of components or modules for purposes of illustration herein, the program code is not so limited. The program code may include additional components, modules, routines, subroutines, etc. In addition, one or more functions may be combined into a single component or module.

The filtering application 330 implements one or more filter to reduce the data non-linearly. Examples of suitable filters are described in more detail below, and include a production rule engine, a intelligence gathering engine, a winnowing engine, and a hybrid engine. The filtered data is then saved to a database 340 or other suitable data structure, where the filtered data can be accessed for further processing/analytics 350, and/or generating suitable output via interfaces 360 and/or 365.

The filtering application 330 may be executable to generate performance metrics. It is noted that the term "performance metric" is defined as the actual production values (e.g., measured on the floor) or derived production values (e.g., using simulation). The performance metric at the system level can be, by way of example: throughput, end-to-end cost per page, etc.; at the machine level: utilization rate, capacity, inventory build-up, breakdown frequency, etc. The performance metric at the labor level can be, by way of example: time to perform a task, number of different types of works able to perform, etc.

The system architecture 300 may also include program code executable to generate an exception when actual performance metrics are outside a predetermined range of the efficiency metrics. A user can choose from responding to the exception, ignoring the exception, and delaying the exception. The program code may be further executable to notify a user when and how to increase and decrease production at the one or more PSP facility.

The system architecture 300 may also include program code executable to generate target production at different granularities of the one or more PSP facility. Different granularities may also be available for different access levels. For example, long term planning may be provided with an overview of production across multiple PSP facilities. Print shop management may be provided with overall production at a particular PSP facility. And operators and their respective managers may be provided with a view of production for a particular station or group of stations at the PSP facility. The program code may also be executable to generate production histories for different granularities of the one or more PSP facility, e.g., for reporting and planning.

The system architecture 300 may also include program code executable to generate various efficiency metrics, such as the maximum achievable rate of a production variable based on the actual floor conditions (e.g., number of machines online, operator efficiency). Actual production data (e.g., capacity, throughput) of an individual station or group of stations may also be determined (e.g., using the monitored information). This information may be relayed to one or more users, e.g., as part of a visual presentation in real-time to one or more workers or managers on the PSP floor.

Figure 4:
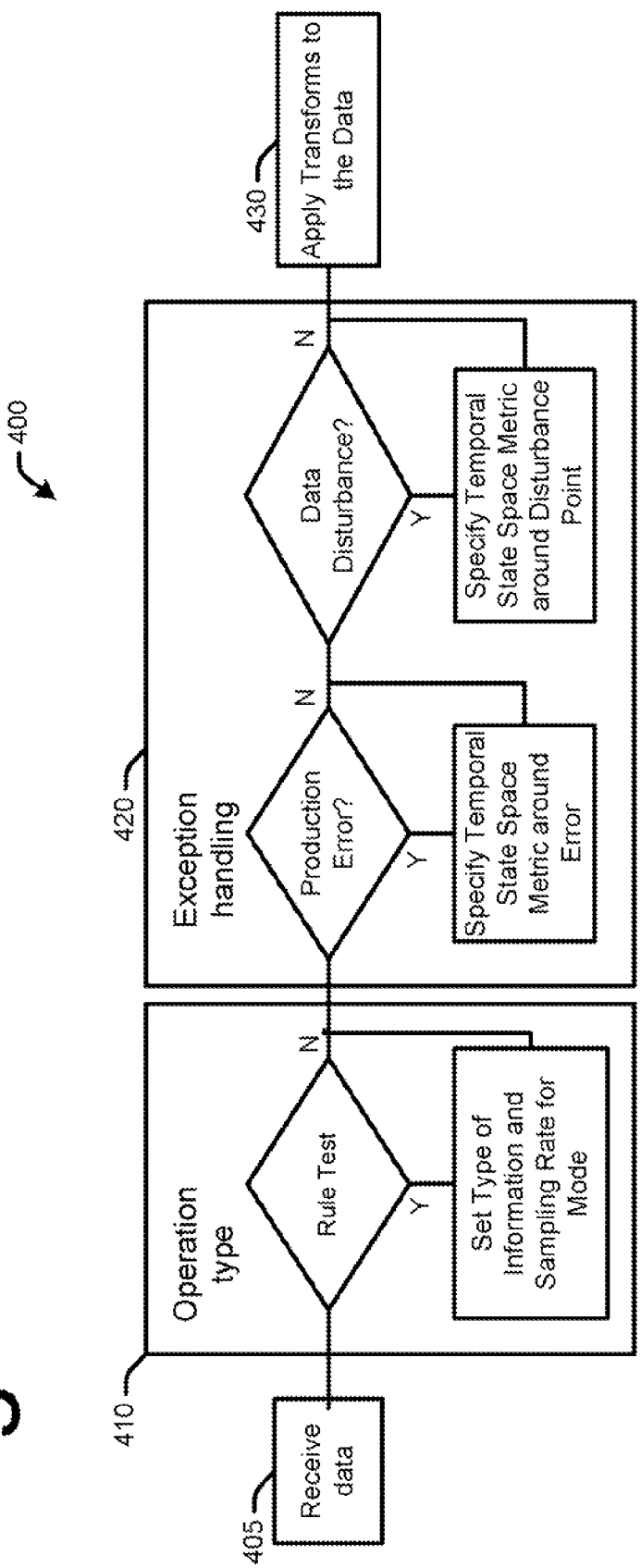
FIG. 4 shows an example process diagram for implementing a production rule engine for data filtering for a PSP.

FIG. 4 shows an example process diagram for implementing a production rule 400 engine for data filtering for a PSP. This implementation is based on behavioral rule programming, including in its simplest form, a precondition ("IF" statement) and action ("THEN" statement). A rule interpreter 410 executes a forward chaining algorithm to check the data 405 against the rules. The rules are saved in the knowledge base and can be dynamically changed. Engine 400 can be processed fast for a real-time solution.

The rules in the knowledge base can be derived from experience, past operations, logging data, industry standards, or through modeling and simulations. It is noted that the rules are not necessarily static. Therefore, when the operations environment changes (e.g., different demand pattern), the simulation platform can provide assistance to quantify the applicability of current rules and propose changes.

In the first step, the operating mode of the PSP is determined using predetermined rules. The PSP environment may be a complex system, so varying weights and priorities may be used to sort any conflict between the potential production rules. Depending on the identified mode, a combination of information is kept, and the sampling rate is set accordingly. The information deemed to be not useful is discarded.

In the next step, production exceptions 420 are determined. Exception handling may include, for example, machine-down status, job-rework, or any other abnormality or error. If an error is found, then the state space parameters around the event may be recorded to enable a detailed analysis of the event, either automatically or by the user. Examples of tools that can be used to determine errors or an abnormal behavior include, but are not limited to, using threshold limits for expected processes, or using principal component analysis (PCA). The PCA engine 400 is particularly useful in identifying hard to detect anomalies, and includes monitoring for a change in the number of components, wherein the change signifies a broken correlation between variables, and hence an abnormal behavior that should be addressed.

After exception handling, transforms may be applied to the data so that the data is reduced, enhanced, and stored and/or output for the user at 430.

Figure 5:
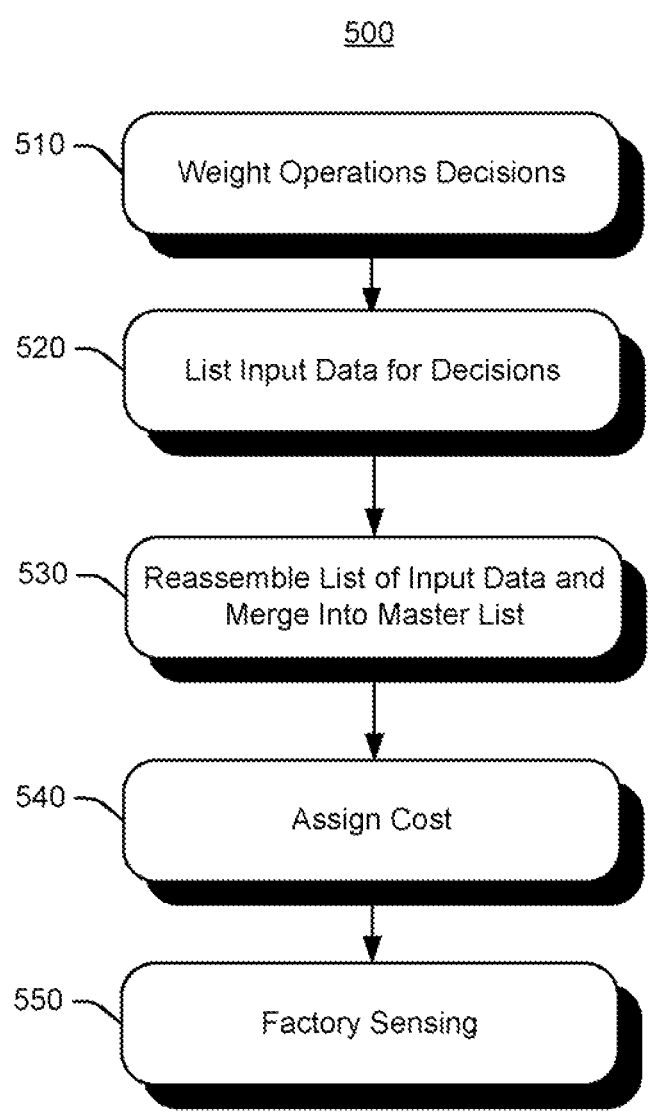
FIG. 5 shows an example process diagram for implementing an intelligence gathering engine for data filtering for a PSP.

FIG. 5 shows an example process diagram 500 for implementing an intelligence gathering engine for data filtering for a PSP. The intelligence gathering engine is not driven by ad hoc sensing convenience. Instead, the data gathering is driven by objective discovery techniques, such as computer-aided knowledge discovery (CAKD).

In one example, a list is generated of the operations decisions that need to be made. Each decision is associated with a weight 510 (e.g., impact on profit, cost, efficiency, environmental considerations). The weight 510 may be in the unit of a dollar amount. Each decision produces a list of input data 520 to support a particular decision. Each input data 520 inherits the weight assignment 510 from the decision it supports.

Then, the list of input data is re-assembled and merged into a master list 530 of input data. For data that can support multiple decisions, the weight 510 accumulates. This results in the desired sensing list where the weight 510 qualifies the level of desire (e.g., in the unit of dollar amount). A new column, "cost" (e.g., in the unit of dollar amount), is added to the desired sensing list, and each data is assigned a cost 540 corresponding to the engineering cost to implement the sensing. The cost column offsets the level of desire.

The desired sensing list 550 is then sorted according to the level of desire, and arrives as the production requirement documentation for the factory sensing. Accordingly, the engine provides a roadmap for systematic operations intelligence data gathering, and also provides priority for practical implementation.

Figure 6:
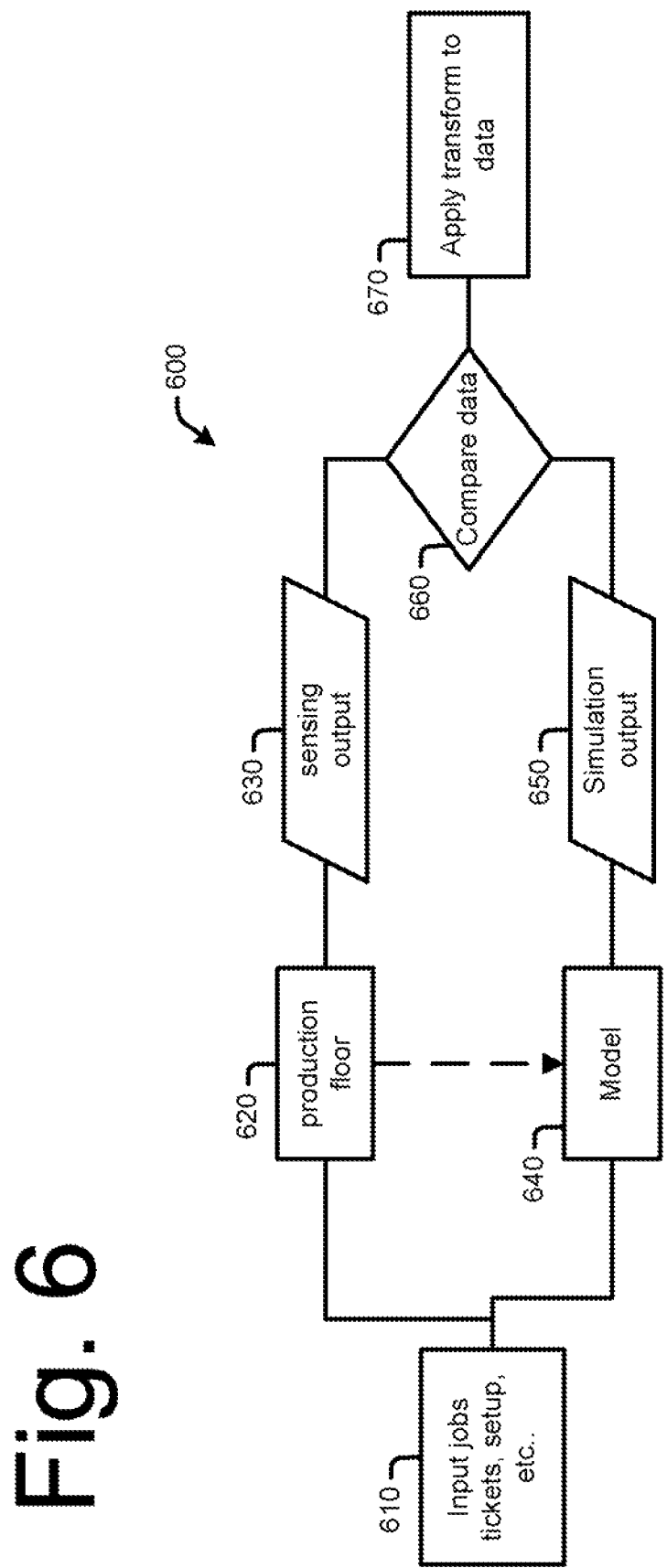
FIG. 6 shows an example process diagram for implementing a winnowing engine for data filtering for a PSP.

FIG. 6 shows an example process diagram for implementing a winnowing engine 600 for data filtering for a PSP. According to this engine 600, a model 640 of the factory floor is saved along with setup parameters. In one example, a fairly complete model 640 can be readily documented using an XML file of a few MBs in size (e.g., compared to multiple GBs for the original data). This file is much easier to pass across a network, especially if dealing with a wireless connection for a mobile device.

The model 640 of the production floor runs in parallel. It receives the same job tickets 610, and set-up information as the actual floor production 620. In addition, the model 640 receives the operation condition of the production floor 620 such as equipment current status, number of workers. The output of the simulation 650 is then compared 660 with the sensing output 630 from the floor. Only the data that cannot be reproduced by the simulation model 640 is recorded. That is, if there are discrepancies, then the data is saved, otherwise it is discarded. Transforms may be applied to the data so that the data is reduced, enhanced, and stored and/or output for the user at 670.

Figure 7:
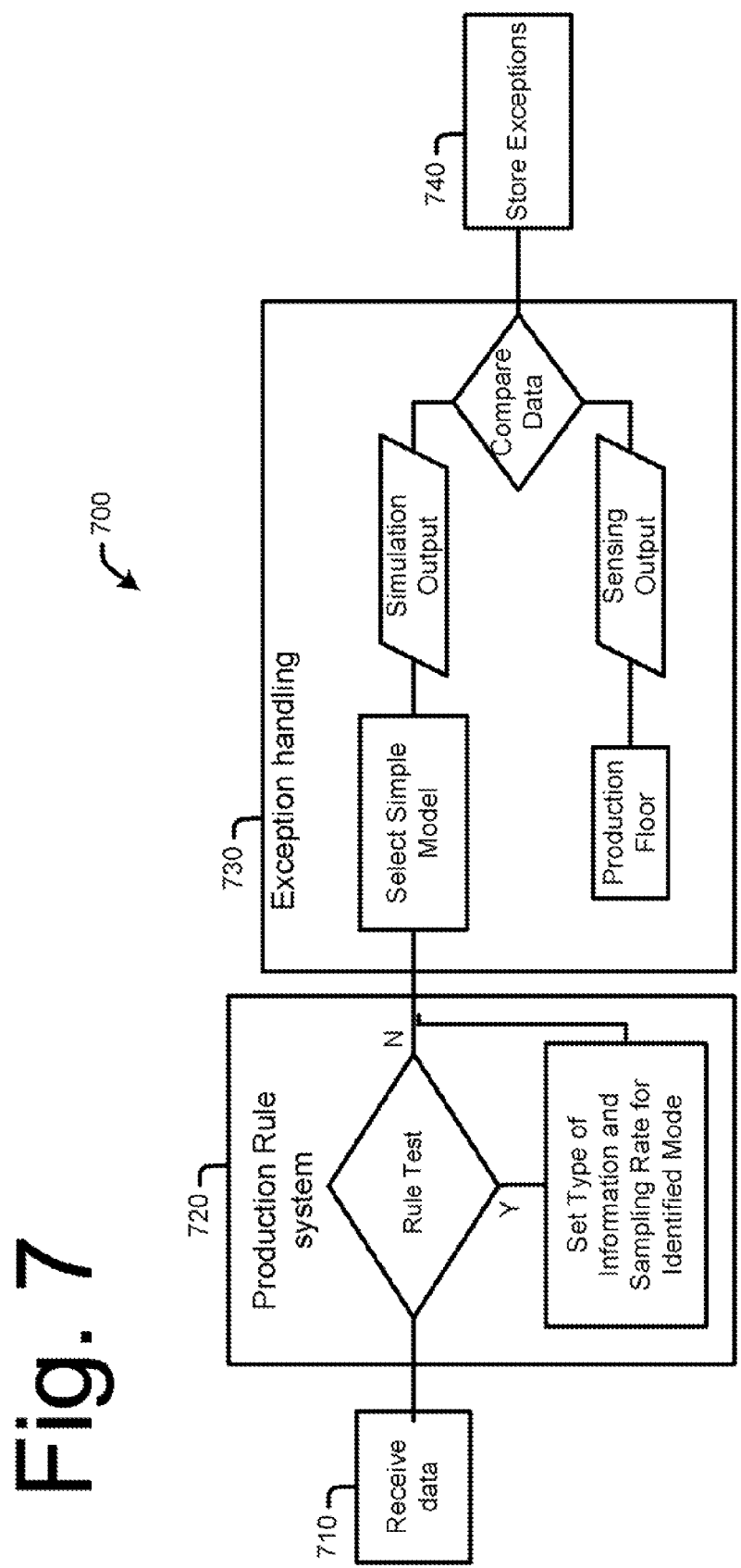
FIG. 7 shows an example process diagram for implementing a hybrid engine for data filtering for a PSP.

FIG. 7 shows an example process diagram for implementing a hybrid engine 700 for data filtering for a PSP. The hybrid engine 700 uses portions of the previously discussed embodiments in a layered approach for received data 710. In the first step 720, a production rule system is used to determine the mode of production and which data should be kept. The second step 730 uses the result to select a "simple model" to compare the floor data and identify exceptions 740. The term "simple model" is used herein to refer to a model is relatively dose to the actual operation, without having to predict exactly. This solution may be used to find a balanced solution that can execute quickly fast and process data in real time by separating the functionalities which enable use of smaller and simpler models. The hybrid engine 700 is particularly advantageous, for example, when creating a summary view of the health or state of the PSP for the user on a bandwidth limited platform such as a mobile device. Accordingly, the user sees a full representation of the data.

Before continuing, it is noted that the system and methods described herein may also be implemented with a simple to use and understand interface (e.g., for access via a mobile device). The interface provides the user with accurate and dynamic feedback to enable performance monitoring and improvement. The system can also be used to show the user early warnings of potential problems on the production floor. By looking at historical, predicted, and actual performance of an entire system based on the measured data and the derivation, users can determine whether certain changes are needed to be implemented in advance of a problem.

For purposes of illustration, if the measured inventory build-up upstream of one machine class is significantly higher than the prediction and is growing, this may be a strong indicator that the capacity of that particular machine class is operating in a reduced capacity, which could be due to a machine failure or potential failure yet to be discovered. Corrective responses may include dispatching engineers to the floor to examine the machines, bringing reserve capacity online (such as a new machine or shifting operators from another area), or slowing down the upstream production to reduce or prevent inventory build up. The real-time feedback alerts managers and operators so that the appropriate resources can be allocated to maintain desired efficiencies and reduce or prevent the effect of problems early on.

Average, shift statistic, or target values can also be presented alongside to give a reference point of view. The employees or the management can use such a feedback to know how well they are currently performing relative to the metrics and where in the system they need to allocate more resources to eliminate potential bottlenecks. Matching or exceeding the metric can also provide useful information. The benchmark metric may also be based on the quality of the product. For example, faster is not necessarily better if the product needs a lot of rework. Likewise, a slow performer may be due to upstream quality issues which should be accommodated or taken into consideration.

In another embodiment, the filtered data may be utilized for job tracking, and/or visualization of a particular job or set of jobs. This is useful when a manager wants to know where a job is or what is the path thru the PSP currently is or path taken to determine status update or investigate problems or potential problems.

In addition to filtering, the use of the individual job information may also be "cleaned." The PSP keeps all of the tracking data for an individual job for several reasons. This data may consume the largest amount of memory. Accordingly, the systems and methods described herein may also clean, complement, and/or reduce the amount of this data. That is, the raw data sometimes is incomplete (e.g., with processing steps missing) or corrupt. In an example embodiment, a simulation that runs in parallel with actual data gathering may be used to supplement and/or reconstruct and/or remove/replace missing and/or corrupt data. The simulation is a close representation of the actual floor data, and incorporates the actual operational conditions on the floor. Therefore, if a portion of the data is missing or corrupt (e.g., as noted by a user), then that data can be inferred or replaced with the simulation data.

Before continuing, it is noted that the systems and devices discussed above are merely intended to be representative of various embodiments which may be implemented. Still other physical embodiments are contemplated and will become readily apparent to those having ordinary skill in the art after becoming familiar with the teachings herein based at least in part on desired implementations and the current state of the art for the various components.

Figure 8:
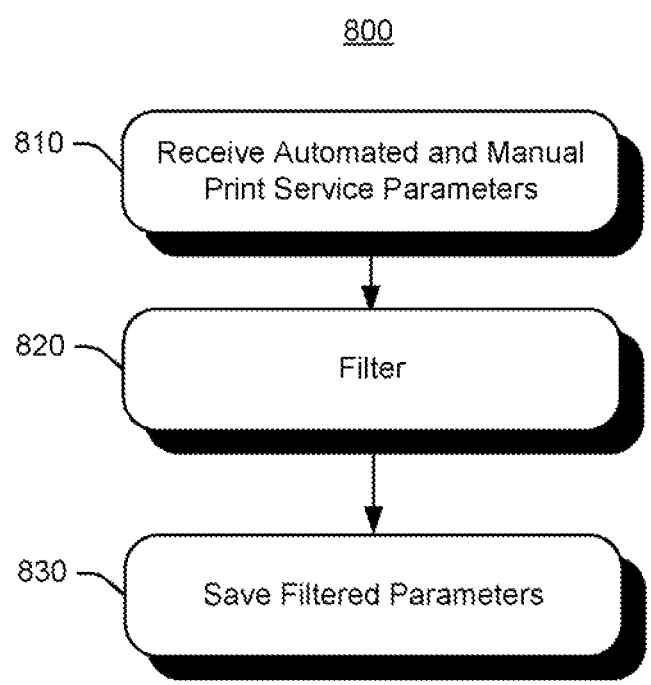
FIG. 8 is a flowchart illustrating exemplary operations which may be implemented for data filtering for a PSP.

FIG. 8 is a flowchart illustrating exemplary operations which may be implemented in data filtering for a PSP. Operations 800 may be embodied as logic instructions on one or more computer-readable medium. When executed on a processor, the logic instructions cause a general purpose computing device to be programmed as a special-purpose machine that implements the described operations. In an exemplary implementation, the components and connections depicted in the figures may be used.

In operation 810, a plurality of print service parameters are received. The print service parameters may be automatic print service parameters and/or manual print service parameters. Automatic print service parameters may include, but are not limited to, machine status, machine throughput, machines online, machines offline, print job scheduling, print job location in the PSP, pending service requests, general input/comment, special flag, machine parameters, and historical data.

In operation 820, the plurality of print service parameters are filtered, wherein only a portion of the received plurality of print service parameters are retained. For example, filtering may be by using a production rule system, an intelligence gathering system, a winnowing system, and/or a hybrid system (using one or more of these and/or other systems).

In operation 830, the filtered print service parameters are saved for enhancing automatic and manual print production processes (e.g., using one or more analytic tools). For example, the filtered print service parameters may be used to derive performance metrics of the PSP based on predictive methods. Deriving performance metrics is based on at least one of: modeling, simulation, inference from historical data, a knowledge base, machine learning program, and a combination thereof.

The operations shown and described herein are provided to illustrate exemplary implementations of data filtering for a PSP. It is noted that the operations are not limited to the ordering shown. Still other operations may also be implemented. For example, additional operations may include substituting corrupt or missing data with simulated data, and using the filtered print service parameters for job tracking (e.g., to determine where a job is at any given time in the PSP).

A lot of data is recorded, and the operations reduce the amount of data for processing and providing worthwhile, summary information which can be used to improve performance of the PSP.

It is noted that the exemplary embodiments shown and described are provided for purposes of illustration and are not intended to be limiting. Still other embodiments are also contemplated.

The invention claimed is:

1. A method of filtering data for a print service provider (PSP), comprising:
    receiving a plurality of print service parameters, the print service parameters including operational data of the PSP;
    filtering the plurality of print service parameters, wherein only a portion of the received plurality of print service parameters are retained in machine readable format; and
    saving the filtered print service parameters to at least one of perform analysis, make predictions, and provide recommendations for enhancing automatic and manual print production processes.

2. The method of claim 1, further comprising using the filtered print service parameters for job tracking.

3. The method of claim 1, wherein the filtered print service parameters are used to derive performance metrics of the PSP based on predictive methods including at least one of: modeling, simulation, inference from historical data, a knowledge base, machine learning program, and a combination thereof.

4. The method of claim 3, wherein the print service parameters include:
    a plurality of automatic print service parameters include at least one of the following: machine status, machine throughput, machines online, machines offline, print job scheduling, print job location in the PSP, pending service requests, general input/comment, special flag, machine parameters, and historical data; and
    a plurality of manual print service parameters include at least one of the following: employee status, employee throughput, total employees, employee experience, employee scheduling, and historical data.

5. The method of claim 1, wherein filtering is by using a production rule system.

6. The method of claim 1, wherein filtering is by using an intelligence gathering system.

7. The method of claim 1, wherein filtering is by using a winnowing system.

8. The method of claim 1, wherein filtering is by using a hybrid system using intelligence gathering, winnowing, and another filtering system.

9. The method of claim 1, further comprising substituting corrupt or missing data with simulated operational data for the plurality of print service parameters.

10. A system for filtering data for a print service provider (PSP) facility, comprising:
    a short-term storage facility configured to receive a plurality of print service parameters, the print service parameters including operational data of the PSP facility;
    a filtering mechanism configured to read the plurality of print service parameters from the short-term storage facility and retain a portion of the plurality of print service parameters; and
    a long-term storage facility configured to save the filtered print service parameters, the long-term storage facility accessible by at least one analytics module for enhancing print production processes.

11. The system of claim 10, wherein the filtering mechanism includes a production rule system.

12. The system of claim 11, wherein the production rule system includes a rule interpreter configured to execute a forward chaining algorithm to check the plurality of print service parameters against a plurality of rules.

13. The system of claim 10, wherein the filtering mechanism includes an intelligence gathering system.

14. The system of claim 13, wherein the intelligence gathering system:
    determines a plurality of operations decisions to be made and associates each operations decision with a weight;
    produces input data for each operations decision, each input data inheriting the weight from the corresponding operations decision;
    reassembles the input data into a master list of input data;
    assigns cost to the master list of input data; and
    sorts the master list based on cost.

15. The system of claim 10, wherein the filtering mechanism includes a winnowing system.

16. The system of claim 15, wherein the winnowing system only saves print service parameters that cannot be derived by simulation.

17. The system of claim 10, wherein the filtering mechanism includes a hybrid system.

18. The system of claim 17, wherein the hybrid system includes at least two of a production rule system, an intelligence gathering system, and a winnowing system.

19. A print service provider (PSP) data filtering system including program code stored in non-transitory computer-readable storage and executable by a processor to:
    receive a plurality of print service parameters, the print service parameters including operational data of the PSP;
    filter the plurality of print service parameters;
    retain the filtered print service parameters; and analyze only the retained print service parameters for enhancing print production processes.

20. The system of claim 19, wherein the program code is further executable to substitute corrupt or missing data with simulated data.

21. A method of filtering data for a print service provider (PSP), comprising:
- receiving a plurality of print service parameters;
- filtering the plurality of print service parameters, wherein only a portion of the received plurality of print service parameters are retained in machine readable format;
- saving the filtered print service parameters for enhancing automatic and manual print production processes;
- determining a plurality of operations decisions to be made and associating each operations decision with a weight;
- producing input data for each operations decision, each input data inheriting the weight from the corresponding operations decision;
- reassembling the input data into a master list of input data;
- assigning cost to the master list of input data; and
- sorting the master list based on cost.

22. A print service provider (PSP) data filtering system including program code stored in non-transitory computer-readable storage and executable by a processor to:
- receive a plurality of print service parameters;
- filter the plurality of print service parameters;
- retain the filtered print service parameters;
- analyze only the retained print service parameters for enhancing print production processes;
- determine a plurality of operations decisions to be made and associate each operations decision with a weight;
- produce input data for each operations decision, each input data inheriting the weight from the corresponding operations decision;
- reassemble the input data into a master list of input data;
- assign cost to the master list of input data; and
- sort the master list based on cost.

* * * * *